(12) United States Patent
Oks

(10) Patent No.: US 7,414,379 B2
(45) Date of Patent: Aug. 19, 2008

(54) SERVO CONTROL SYSTEM

(75) Inventor: Vladimir I. Oks, Medford, MA (US)

(73) Assignee: Cambridge Technology, Inc., Lexington, MA (US)

( * ) Notice: Subject to any disclaimer, the term of this patent is extended or adjusted under 35 U.S.C. 154(b) by 0 days.

(21) Appl. No.: 11/546,802

(22) Filed: Oct. 12, 2006

(65) Prior Publication Data

US 2007/0085506 A1    Apr. 19, 2007

Related U.S. Application Data

(60) Provisional application No. 60/726,582, filed on Oct. 14, 2005.

(51) Int. Cl.
*G05B 11/36* (2006.01)
(52) U.S. Cl. .................. 318/609; 318/561; 388/906
(58) Field of Classification Search ............ 318/560, 318/561, 609, 610, 626, 627, 632; 388/906
See application file for complete search history.

(56) References Cited

U.S. PATENT DOCUMENTS

| 4,427,896 A | * | 1/1984 | Waldron | 290/40 R |
| 5,384,526 A | * | 1/1995 | Bennett | 318/610 |
| 5,691,615 A | * | 11/1997 | Kato et al. | 318/609 |
| 6,111,878 A | * | 8/2000 | Powell | 370/395.62 |
| 6,445,980 B1 | * | 9/2002 | Vyers | 700/282 |
| 6,762,580 B1 | * | 7/2004 | Marra et al. | 318/563 |
| 6,859,006 B2 | * | 2/2005 | Hayashi | 318/610 |
| 7,187,153 B2 | * | 3/2007 | Imagawa et al. | 318/638 |

* cited by examiner

*Primary Examiner*—Bentsu Ro
(74) *Attorney, Agent, or Firm*—Terry Cohen; Burns & Levinson LLP

(57) ABSTRACT

A servo control system having a proportional (P) or a proportional plus integral (PI) position controller, which output signal represents an input speed reference signal for a speed close loop system with a speed controller detecting a speed deviation, derived from a speed feedback loop, which output signal represents an input current reference signal for a current close loop system with a current controller detecting a current deviation, derived from a current feedback loop, which controls an amount of the current flowing through a motor. The position controller detects the position deviation between a position reference signal and a position feedback signal separately for the P part controller, to produce a P part speed reference signal, and for the I part controller, to produce an I part speed reference signal, as a "two parallel-position outer loop feedback control system" and includes a position reference reduction circuit with scale coefficient less than one for the close loop with the P part controller. The P part controller and the I part controller connect to the summing unit, which sums the P part speed reference signal and I part speed reference signal, and its an output signal represents the speed reference signal for the speed close loop system.

1 Claim, 7 Drawing Sheets

SERVO CONTROL SYSTEM

CROSS REFERENCE TO RELATED APPLICATION

I claim benefits of provisional application 60/726,582 filed on Oct. 14, 2005, entitled "Servo Control System".

FIELD OF THE INVENTION

The present invention relates to servo control systems, and more particularly, to position servo control systems for galvanometers, scanners and any other servomotors with high speed positioning.

DESCRIPTION OF THE RELATED ART

A primary purpose of a servo control system is to reduce rapidly and smoothly the deviation between the desired position of a motor with a load and the actual position of the motor with the load in response to the changes of the position reference. Servo control systems having a proportional (P) or a proportional plus integral (PI) position controllers are in widespread use where an appropriate tradeoff between minimum response time and positioning accuracy is desired.

FIG. 1 illustrates a simplified unity feedback servo control system with a conventional PI controller. An input reference signal r is compared with feedback signal $f_p$ at summing unit 1, which in this case computes the difference between the signals, to obtain deviation e. The deviation e is inputted into the P part controller 2 having transfer function Kp and into the I part controller 3 having transfer function Ki/s. The P part and I part of the controller generate, correspondingly, output signals $m_p$ and $m_i$. The output signal $m_\Sigma$ of the summing unit 4 represents the sum of these two signals $m_p$ and $m_i$ and is inputted into a plant block 5 having a transfer function Gp(s). The plant block 5 includes all components, which are shown by FIG. 2 as subsystem 25.

FIG. 2 illustrates a conventional servo control system including a PI controller in greater detail. In comparison to FIG. 1, FIG. 2 additionally illustrates that the plant block 25 includes: (a) summing/subtraction unit 12, that detect deviation signal $e_s$ between speed reference signal $r_s$ and speed feedback signal $f_s$; (b) speed controller 13 having, for example, transfer function Gs; (c) summing/subtraction unit 14, that detects deviation signal $e_c$ between current reference signal $r_c$ and current feedback signal $f_c$; (d) current controller 15 having, for example, transfer function Gc; (e) power amplifier 16, to supply the controlled amount of current c flowing through a motor; (f) current sensor 18; (g) current monitor 17 having, for example, transfer function $H_c$; (h) speed sensor 19; (i) position sensor 20; and (j) motor 21.

It is common for servo control systems to have a current close inner loop system 23 for controlling the amount of current c flowing through motor 21, speed controller 13 for generating an input current reference signal $r_c$ in a speed close loop system 24, which is sequentially configured with the current control system 23, and a position controller 22 for generating an input speed reference signal $r_s$ in a position close outer loop system 26, which is sequentially configured with the speed control system 24. The speed control system 24 can be viewed as an inner speed loop for the outer position loop system 26. The inner speed loop provides dynamic compensation to increase dynamic rage and minimize transient response time.

FIG. 3 illustrates a conventional servo control system having a P controller in greater details. In such systems, there is simply a P controller 28 that generates the speed reference $r_s$ for the inner speed loop system 42. A speed sensor 43 is constructed with low frequency damping means 33 that generates low frequency feedback signal $d_l$ and high frequency damping means 32, that generates high frequency feedback signal $d_h$. The sum of the $d_l$ and $d_h$ signals represents the output feedback signal $f_s$ of the speed sensor 43 similarly to the speed sensor 19 shown on FIG. 2.

It is known that the transfer function of the PI controller is $$Gc(s)=Kp+Ki/s$$

Where:

s—a Laplace operator

Kp—a gain of the proportional P part of the PI controller

Ki=1/T—a gain of the integral I part of the PI controller

T—an integration time constant.

P controllers are defined by pure gain of the value Kp. Thus, the servo system gain that can be varied in order to generate the root locus is a P controller gain Kp. A transient response can be obtained simply by setting the Kp gain in the system, with no dynamic compensation required. In a servo control system having an inner speed closed loop system, however, dynamic compensation is utilized. So by applying the maximum possible value of the Kp gain of the P controllers, the position control system can produce the fastest transient responses, critically damped, without overshoot. But because the P controller transfer function does not have free 's' in the denominator, such systems are servo type '0' and there is inherent steady-state error defined by the Kp gain value. Thus, P controllers are used in situations when the positioning speed is more important then the position accuracy.

PI controllers are defined by gain Kp of the proportional part and by a time constant equal 1/Ki of the integral part. PI controllers have a pole at the origin and a zero at Ki/Kp. In a close-loop system, such controllers tend to shift the closed loop poles to the right in the s-plane as a phase-lag compensators, toward an unstable region. Similarly, in servo control systems having an inner speed closed loop system, there is dynamic compensation. So the position control system with PI controllers can produce slower transient responses than systems with pure P controllers, critically damped, without overshoot. But because PI controller transfer functions have free 's' in the denominator, such systems are servo type '1' and the steady-state error is zero. Thus, such controllers are used in situations wherein the positioning speed is less important then the position accuracy.

From Mason's gain formula, the transfer function of the closed loop of the system depicted in FIG. 1 can be expressed as $$Go(s)=c(t)/r(t)=(Kp/Ki*s+1)/[(1+Kp*Gp(s))/Ki/Gp(s)*s+1]$$

The coefficients Kp and Ki are to be determined to meet the close loop poles and zero locations that define certain design criteria of the servo control system. Most of the time, there is a trade-off between critically damped transient response time and steady state accuracy. This depends on the physical system under consideration and the specific characteristic requirements of the servo system.

While such systems are suitable for certain applications, a need still remains for servo control systems utilizing P or PI controllers having decreased critically damped transient response time with increased positioning accuracy.

DESCRIPTION OF THE INVENTION

It is an objective of the present invention to provide a servo control system with a position PI controller achieving a decreased transient response time, that is better in performance to that which is achievable by conventional type '0' servo control system.

Another objective of the present invention is to provide a position steady-state error equal to zero or close to zero as in conventional type '1' servo control systems in order to enhance the speed of the system response and to provide precise motor positioning.

It is a further objective of this invention to reduce the noise of the system.

To achieve these objectives, an improved servo control system, according to the present invention, includes in one aspect two position close loops, where the position controller detects the position deviation between a position reference signal and a position feedback signal separately for the P part controller in order to produce a P part input speed reference signal, and for the I part controller, to produce an I part input speed reference signal, as a "two parallel-position outer loop feedback control system" and includes a position reference reduction circuit with scale coefficient less than one for the close loop with the P part controller.

BRIEF DESCRIPTION OF THE DRAWINGS

This and/or other aspects and advantages of the present invention will become apparent from the following description of preferred embodiment, taken in conjunction with the appended drawings, in which.

DETAILED DESCRIPTION OF THE INVENTION

Figure 4:
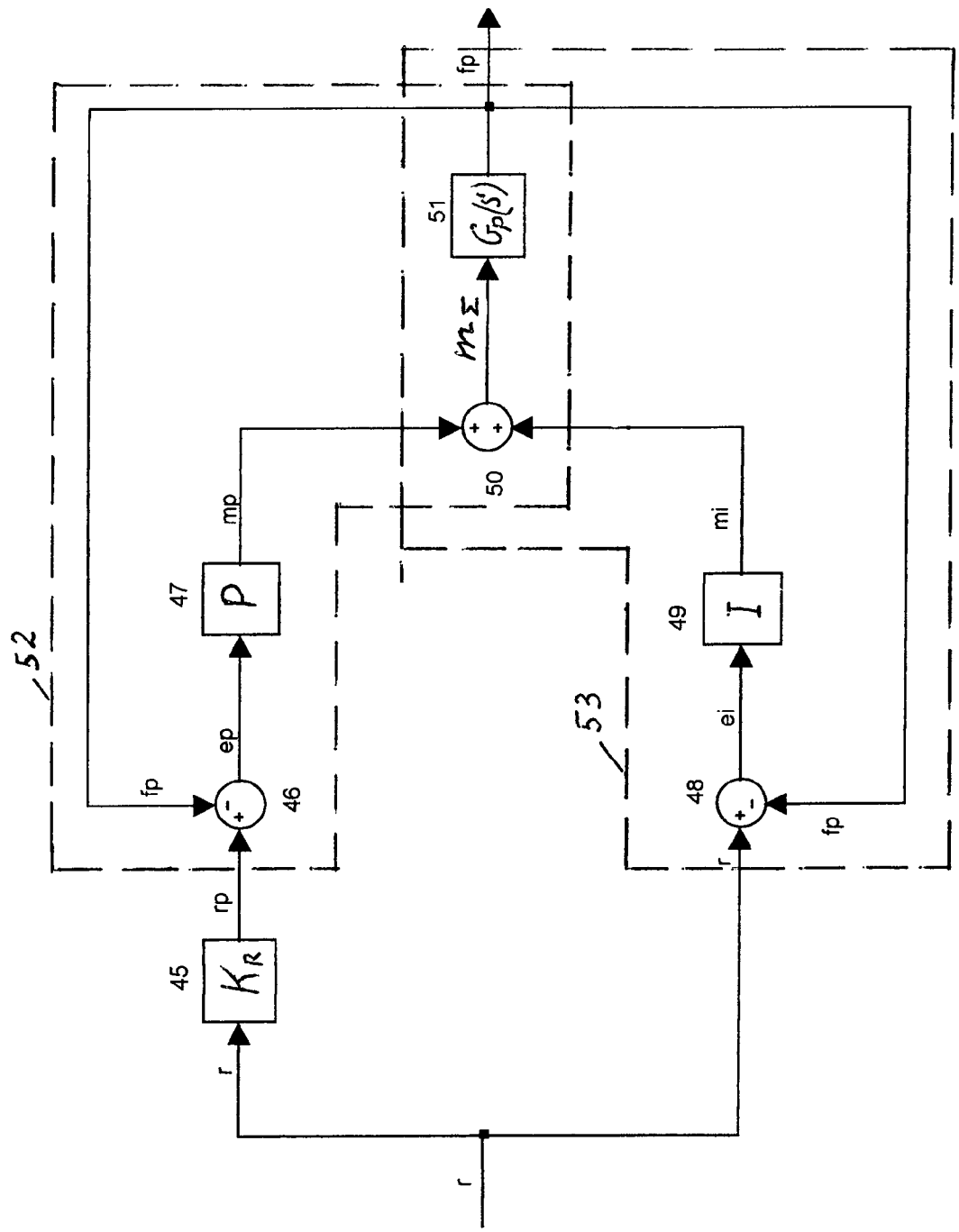
FIG. 4 is block diagram of a system having a PI controller according to an embodiment of the present invention.

For a better understanding of the present invention, reference is made to the accompanying FIG. 4, which illustrates a simplified block diagram of a servo control system.

The input reference signal r is inputted into reduction unit 45, which has a scale coefficient Kr<1, in order to generate reduced reference signal $r_p$. This input reference signal $r_p$ is compared at summing unit 46, which in this case computes the difference between $r_p$ and feedback signal $f_p$, to obtain the deviation $e_p$. The deviation signal $e_p$ is inputted into the P proportional part controller 47, which has transfer function Kp, in order to generate $m_p$ signal.

At the same time, the input reference signal r is directly inputted into summing/subtraction unit 48 to obtain deviation signal $e_i$ between reference signal r and feedback signal $f_p$. This deviation signal $e_i$ is inputted into the I integral part controller 49, which has transfer function Ki/s and generates $m_i$ signal.

The output signal $m_\Sigma$ of the summing unit 50 represents the sum of these two signals $m_p$ and $m_i$, and is inputted into a plant block 51, which represents the same transfer function Gp(s) as described above.

The deviation signal $e_p$, which is fed into P part controller 47, is generated by a close loop system 52, where is the deviation signal $e_i$, which is fed into I part controller 49, is generated by a close loop system 53.

Figure 5:
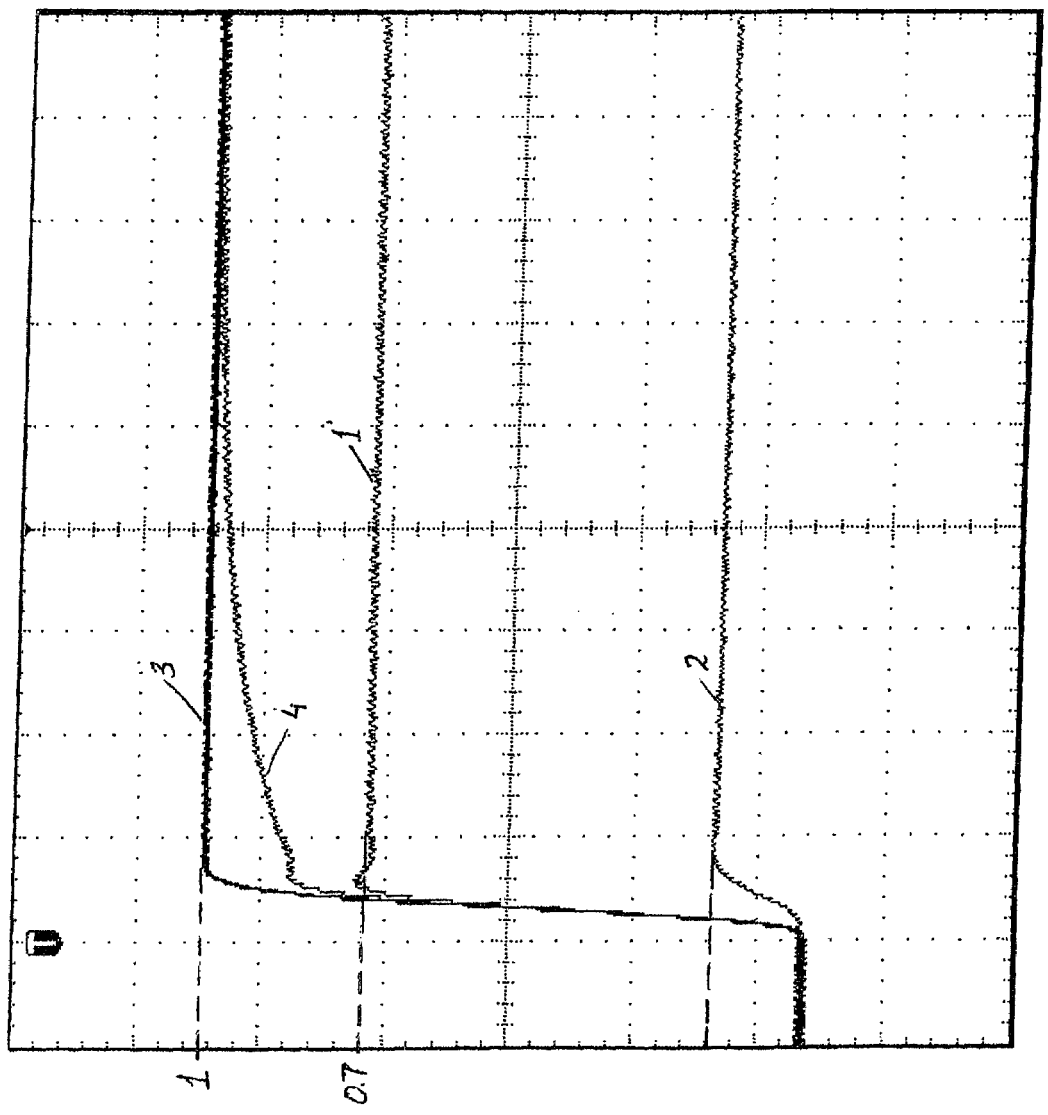
FIG. 5 is a graph illustrating step response of the system according to an embodiment of the present invention.

It is useful to view this configuration from the steady-state response point of view illustrated by FIG. 5, which shows waveforms of positioning step response in accordance with an embodiment of the present invention.

Because the scale coefficient Kr of the reduction unit 45 less then 1, the $r_p$ reference signal less then desirable reference signal r. So the P part controller provides a steady-state response corresponding to the $r_p$ reference signal with a steady-state error defined by the gain Kp. In FIG. 5 the waveform 1 represents the position step response produced by the P part controller, which contribution in this example is equaled approximately 0.7 or 70% of the desirable unity step response, which amount is 100%. The difference between 100% and 70% is compensated by the close loop system 53 with the I part controller 49 and represented in the FIG. 5 by waveform 2. All together PI controller provides the steady-state response with the output signal $f_p$ equal reference r and the steady-state error equal zero. In FIG. 5 the waveform 3 represents the position step response produced by the P part controller plus I part controller. The difference between the reference $r_p$ and desirable reference r, which is determined by reduction unit 45 with scale coefficient Kr, defines what influence has the I integral part controller 49 on the system's steady-state response. For example, if coefficient Kr is one then influence of the I part controller is small. In this case the I part controller compensates just steady-state error, which is created by the close loop 52 and the position control system becomes the conventional system with the P controller. If coefficient Kr is zero then influence of the I part controller is large and the steady-state error is zero. In this case the P controller becomes as a simple feedback-damping device with gain Kp and the position control system becomes the conventional system with the PI controller.

With reference again to the transient response point of view better illustrated in FIG. 4, one can define how this configuration affects the close loop transfer function. This servo control system has transfer function $$Gn(s)=c(t)/r(t)=(Kr*Kp/Ki*s+1)/[(1+Kp*Gp(s))/Ki/Gp(s)*s1]$$

As can be seen, the transfer function is similar to the conventional close loop control system with PI controller. But the difference is that the coefficient of the first order derivative equal Kr*Kp/Ki. Now the three coefficients Kr, Kp and Ki are to be determined to meet the close loop poles and zero locations that define certain design criteria of the servo control system. The coefficient Kr can be selected $$0<Kr<1$$

In this case, the Kr shifts the close loop zero to the left in the s-plane and increases the space between the pole locations. If, for example, the transient step response was under damped with some values of the Kp and the Ki, applying the Kr<1, it becomes less under damped or even over damped with the same values of the Kp and Ki.

Figure 6:
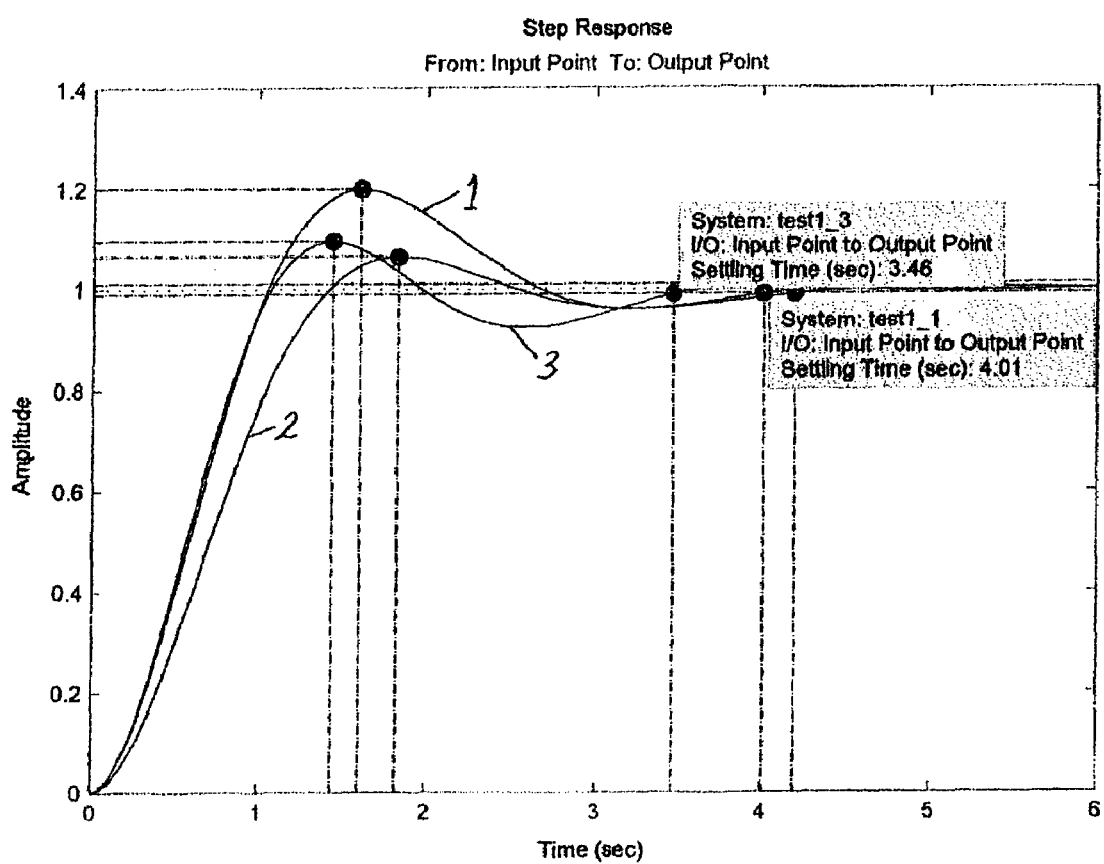
FIG. 6 are graphs illustrating transient response of a conventional system and the system according to an embodiment of the present invention.

In FIG. 6, the waveform 1 represents the position step response produced by the conventional close loop control system that includes the PI controller with some Kp and Ki values and plant with transfer function Gp(s) as a second order system. The waveform 2 represents the control system with the Kr<1 in the embodiment of the present invention with the same values Kp and Ki and the same plant transfer function Gp(s). The waveform 3 represents the control system with the Kr<1 in the embodiment of the present invention with the increased values Kp and Ki and the same plant transfer function Gp(s). As can be seen, the transient responses represented by waveforms 1 and 3 have the same rise time, but maximum over shoot and settling time represented by waveform 3 and reproduced by the system in the embodiment of the present invention is smaller. Similarly, in servo control systems having an inner speed closed loop system, there is dynamic compensation, which can be apply less for the same transient response time then in conventional control system. So this position control system can produce even faster transient responses with better performance, than with pure P controllers, critically damped, without overshoot.

At the same time, the objective of the inner speed close loop system to control speed variable, which is the derivative of the position variable controlled by the servo control system. Because the contribution of PI controller of the position outer close loop system can be increased without destabilization overall servo control system the gain of the inner speed close loop can be decreased. The differentiation is a phase-lead compensation that will tend to shift the root locus toward the left in the s-plane, that is, toward the more stable region. The problem of the phase-lead compensation is evident in that the gain of the differentiation continues to increase with increasing frequency. If high frequency noise is present in the system, the differentiator will amplify this noise, which is generally unacceptable. This is trade off between the positioning speed and noise. Decreasing the gain of the inner speed close loop without loosing dynamic range of the servo control system helps to decrease noise generated by the system.

Figure 1:
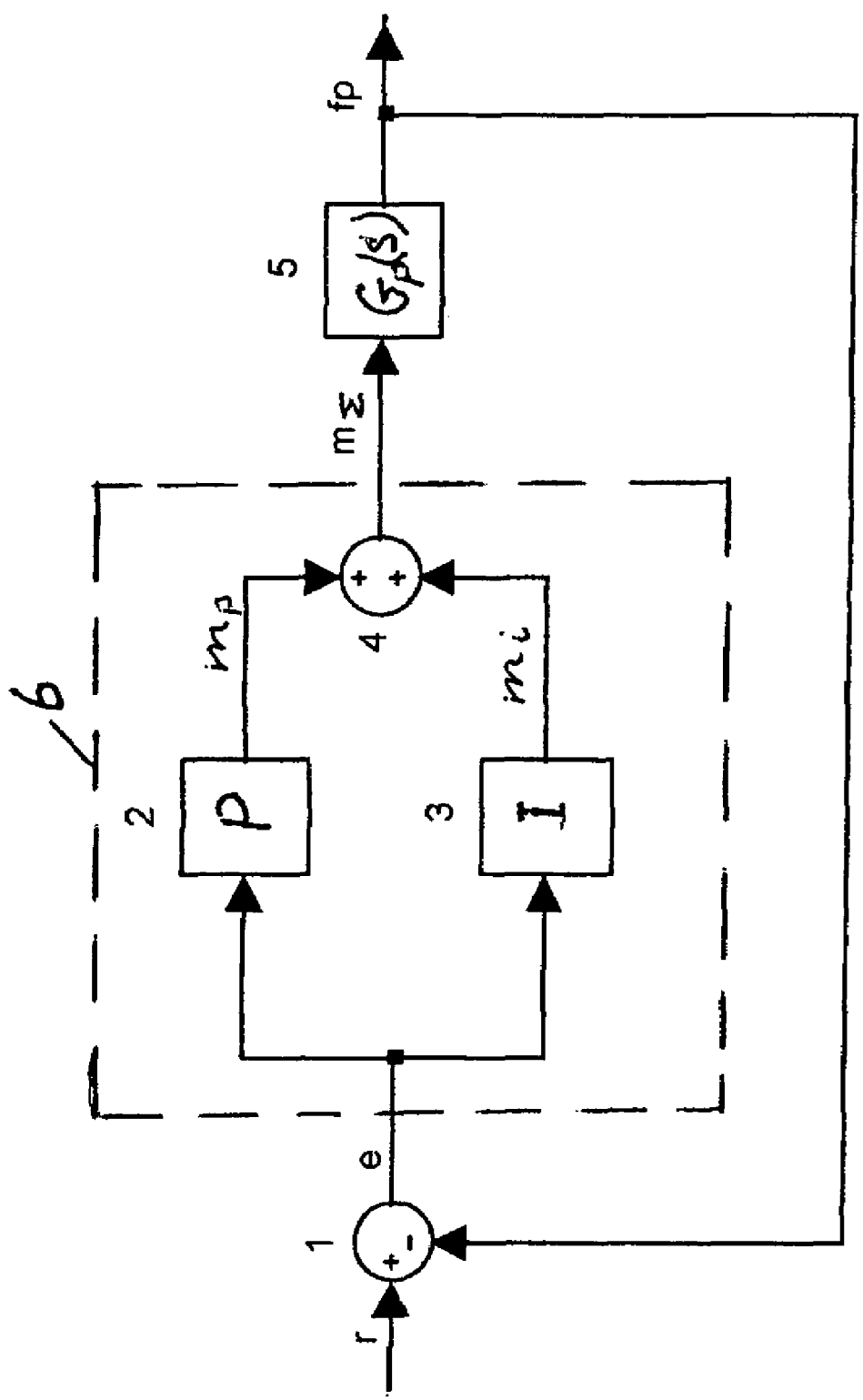
FIG. 1 is a simplified block diagram of a conventional servo control system with a PI controller.
Figure 2:
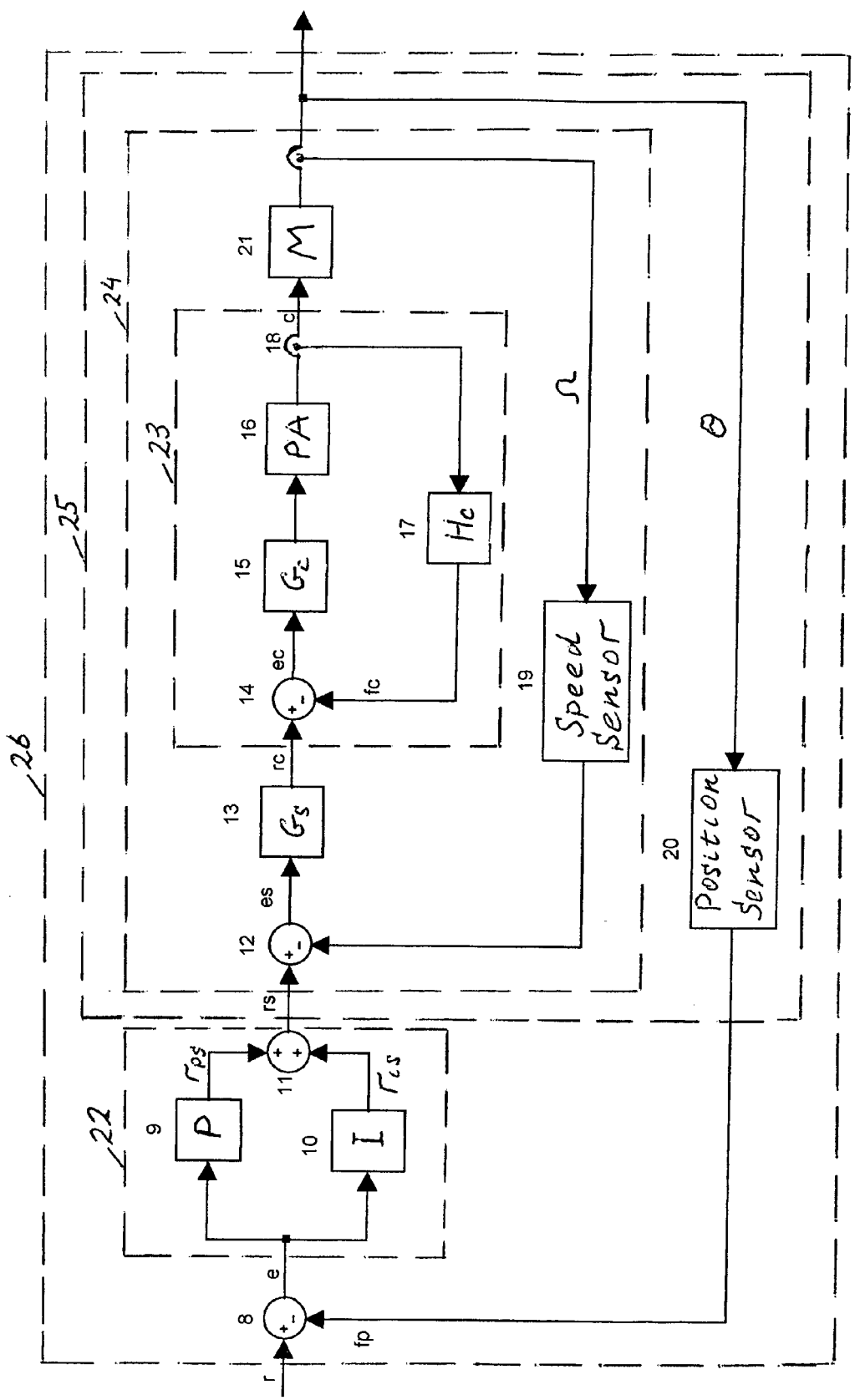
FIG. 2 is a whole block diagram of a conventional servo control system with a PI controller.
Figure 3:
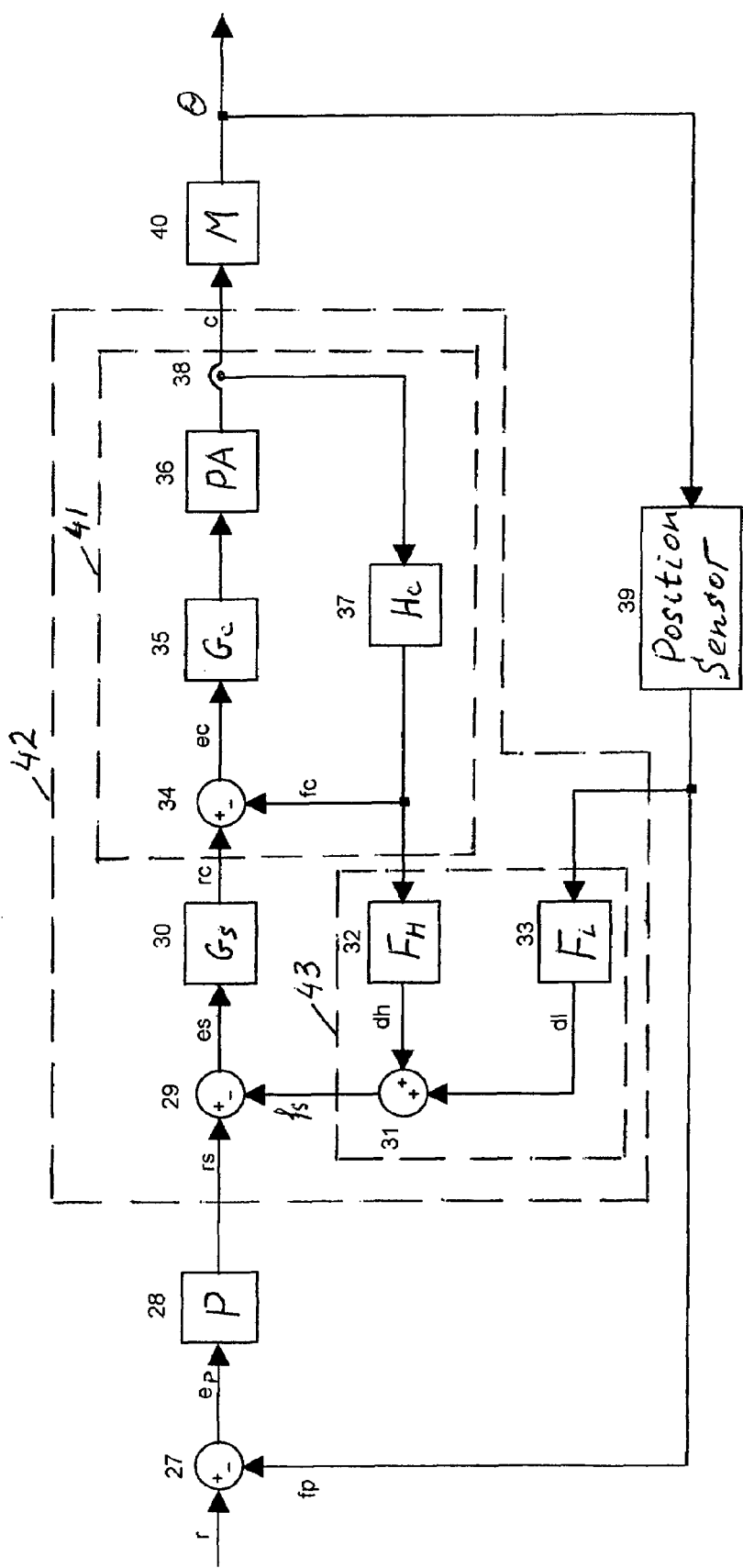
FIG. 3 is the whole block diagram of a conventional servo control system with a P controller and speed sensor in details.
Figure 7:
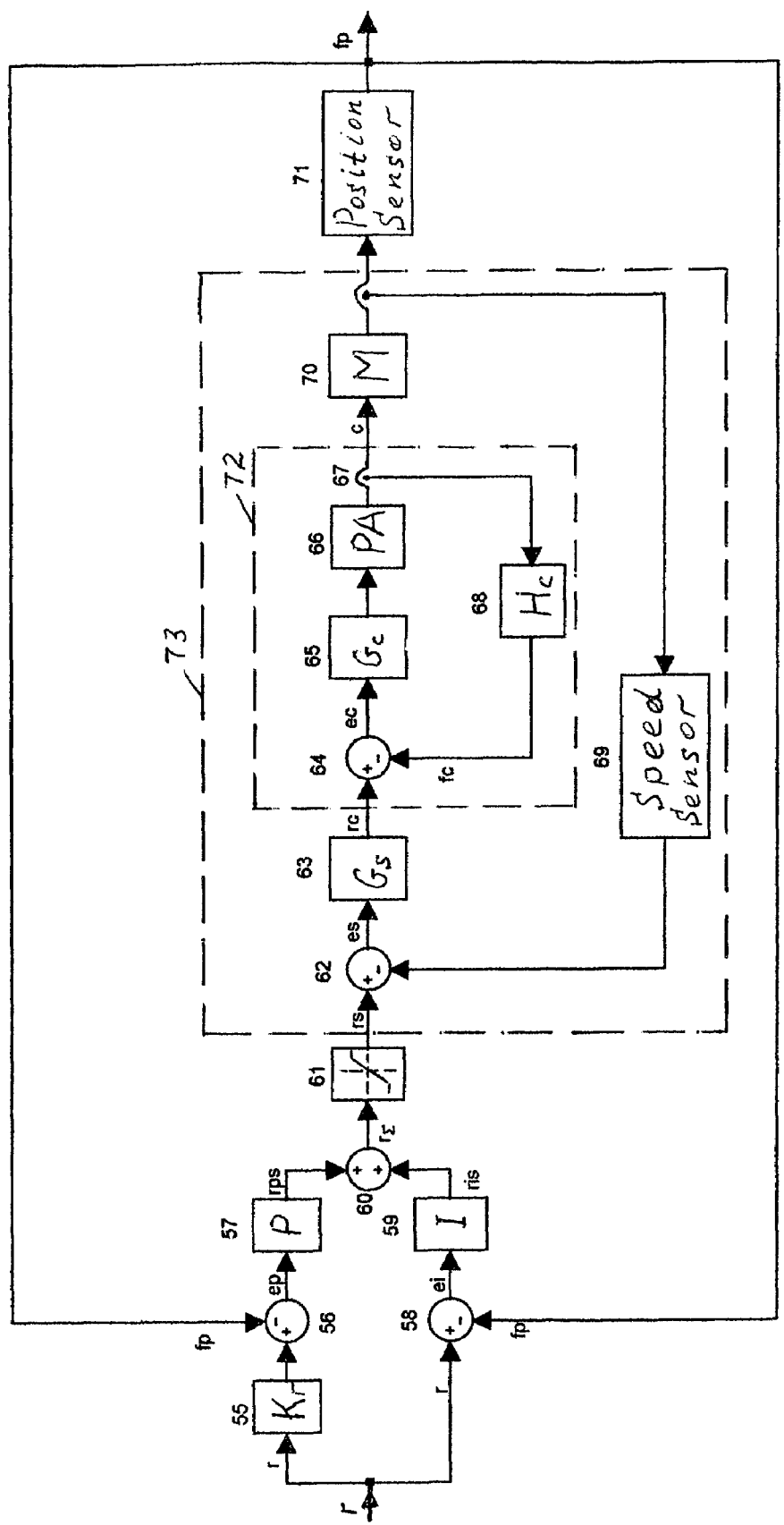
FIG. 7 is whole block diagram of the servo control system according to an embodiment of the present invention.

FIG. 7 illustrates a block diagram representation of an embodiment of the present invention in greater detail. A servo control system according to the present invention in addition to FIG. 4 includes a speed limiter 61 connected in series with a summing unit 60, which sums the P part speed reference $r_{ps}$ and the I part speed reference $r_{is}$ to produce the input speed reference signal $r_\Sigma$. The limiter 61 generates the limiting input speed reference signal $r_s$ for a speed closed loop system 73, similar to the speed close loop system 24 in FIG. 2.

What is claimed is:

1. A servo control system having a proportional (P) or a proportional plus an integral (PI) position controller, which output signal represents an input speed reference signal for a speed close loop system with a speed controller detecting a speed deviation, derived from a speed feedback loop, which output signal represents an input current reference signal for a current close loop system with a current controller detecting a current deviation, derived from a current feedback loop, which controls an amount of the current flowing through a motor, comprising:

a first means to provide a reduced input position reference signal;

a second means for producing a deviation signal, which represents a deviation between the reduced input position reference signal obtained by said first means and a feedback position signal obtained from a position sensor;

a third proportional controller means connected in series with said second means to produce a proportional part for the input speed reference signal;

a fourth means for producing a deviation signal which represents a deviation between the input position reference signal and the feedback position signal obtained from a position sensor;

a fifth integral controller means connected in series with said fourth means to produce an integral part for the input speed reference signal;

a sixth summing unit, which sums the signals produced by said third proportional controller means and by said fifth integral controller means and represent the input speed reference signal for a speed feedback close loop system;

wherein the difference between the desirable input position reference signal and the reduced input position reference signal obtained by said first means define how much of the said fifth integral controller means correspondently to the said third proportional controller means can be applied to position the servo motor to the desired position with the specify characteristics.

\* \* \* \* \*